United States Patent
Kashibuchi

(10) Patent No.: US 10,497,103 B2
(45) Date of Patent: Dec. 3, 2019

(54) INFORMATION PROCESSING APPARATUS, INFORMATION PROCESSING SYSTEM, INFORMATION PROCESSING METHOD, AND RECORDING MEDIUM

(71) Applicant: CANON KABUSHIKI KAISHA, Tokyo (JP)

(72) Inventor: Yoichi Kashibuchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 443 days.

(21) Appl. No.: 15/354,890

(22) Filed: Nov. 17, 2016

(65) Prior Publication Data
US 2017/0154439 A1    Jun. 1, 2017

(30) Foreign Application Priority Data
Nov. 28, 2015  (JP) .................... 2015-232513

(51) Int. Cl.
*G06T 5/50* (2006.01)
*G06T 5/00* (2006.01)
*G06T 7/90* (2017.01)

(52) U.S. Cl.
CPC .......... *G06T 5/008* (2013.01); *G06T 5/50* (2013.01); *G06T 7/90* (2017.01); *G06T 2207/10024* (2013.01); *G06T 2207/10144* (2013.01); *G06T 2207/30088* (2013.01)

(58) Field of Classification Search
CPC ....... G06T 5/008; G06T 5/50; G06T 7/70–90; G06T 2207/10024; G06T 2207/10144; G06T 2207/30088
See application file for complete search history.

(56) References Cited

U.S. PATENT DOCUMENTS

| 2002/0113862 A1* | 8/2002 | Center, Jr. .............. H04N 7/148 348/14.08 |
| 2006/0239525 A1* | 10/2006 | Katayama ............. G06T 19/006 382/128 |

(Continued)

FOREIGN PATENT DOCUMENTS

| JP | 2003-348438 A | 12/2003 |
| JP | 2005-228140 A | 8/2005 |

(Continued)

*Primary Examiner* — Sean T Motsinger
(74) *Attorney, Agent, or Firm* — Canon U.S.A., Inc. I.P. Division

(57) ABSTRACT

There is provided at least one information processing apparatus capable of easily generating a skin color model in which peripheral darkening is considered that is possibly occurring due to an imaging apparatus. At least one embodiment of the information processing apparatus includes an acquisition unit configured to acquire a first image in which a predetermined object is captured with a predetermined exposure condition, and at least one second image in which the predetermined object is captured with an exposure condition or a plurality of exposure conditions different from the predetermined exposure condition; an extraction unit configured to extract color information relating to the predetermined object based on the first image and the at least one second image; and a generation unit configured to generate a color table based on the extracted color information.

13 Claims, 6 Drawing Sheets

(56) References Cited

U.S. PATENT DOCUMENTS

| | | | | |
|---|---|---|---|---|
| 2007/0031033 A1* | 2/2007 | Oh | G06K 9/00228 | 382/167 |
| 2008/0317378 A1* | 12/2008 | Steinberg | G06T 5/50 | 382/275 |
| 2009/0003708 A1* | 1/2009 | Steinberg | H04N 5/232 | 382/190 |
| 2009/0324024 A1* | 12/2009 | Worthington | A61B 5/103 | 382/118 |
| 2010/0185064 A1* | 7/2010 | Bandic | A61B 5/0059 | 600/306 |
| 2011/0299774 A1* | 12/2011 | Manders | G06F 3/017 | 382/168 |
| 2014/0140579 A1* | 5/2014 | Takemoto | G01C 3/08 | 382/106 |
| 2015/0078661 A1* | 3/2015 | Granados | G06T 5/009 | 382/167 |
| 2015/0160730 A1* | 6/2015 | Bei | G06F 3/017 | 345/156 |
| 2016/0065861 A1* | 3/2016 | Steinberg | G06K 9/00228 | 348/239 |
| 2016/0110856 A1* | 4/2016 | Hoof | H04N 5/243 | 382/283 |
| 2017/0154439 A1* | 6/2017 | Kashibuchi | G06T 5/008 | |
| 2019/0086919 A1* | 3/2019 | Zhang | G05D 1/0088 | |

FOREIGN PATENT DOCUMENTS

| | | |
|---|---|---|
| JP | 2007-264860 A | 10/2007 |
| JP | 2010-033220 A | 2/2010 |
| JP | 2011-008704 A | 1/2011 |

* cited by examiner

INFORMATION PROCESSING APPARATUS, INFORMATION PROCESSING SYSTEM, INFORMATION PROCESSING METHOD, AND RECORDING MEDIUM

BACKGROUND OF THE INVENTION

Field of the Invention

The present disclosure relates to a technique for generating a color table of color information about a predetermined object.

Description of the Related Art

Recently, the study of mixed reality (MR) has been conducted. In the MR, information relating to a virtual space is superimposed on a physical space in a real time manner to provide it to a user. In the MR, a composite image is displayed, in which computer graphics (CG) is superimposed on a whole or a part of an actual image captured by an imaging apparatus such as a video camera. This CG is an image in the virtual space created according to the position-and-orientation of the imaging apparatus.

At that time, by extracting a hand area from an image in the physical space, an interference determination between a hand in the physical space and the CG or front-and-back relationship determination between the hand and the CG. However, since the shape of the hand is complicated and differs among individuals, it is difficult to detect the hand area correctly and in high speed from an image.

At present, examples of methods for detecting a hand area include a area segmentation method such as a graph cut, a dynamic contour extraction method such as snakes and LevelSet method, and an learning-base extraction method such as a model fitting and feature extraction. In any of the methods, an initial hand area may be determined by extracting a skin color in many cases. Therefore, it is important to register an appropriate skin color database (color table) to achieve high accuracy.

There are various proposals about a hand extraction method using skin color. For example, Japanese Patent Application Laid-Open No. 2005-228140 discusses a method for generating a skin color model by capturing an image of a hand area, then specifying an object area and non-object area on this captured image via a user interface (UI) such as a mouse operation. This method enables generating a skin color model suitable for the current environment (object and environment) easily, without generating a skin color model by using a plurality of images captured by repeating capturing images of many persons.

However, the method discussed in Japanese Patent Application Laid-Open No. 2005-228140 needs to repeat capturing the images and the UI operations a plurality of times in order to obtain a skin color model with sufficient accuracy. As a result, users have to perform extremely cumbersome user operations. In particular, in a case where a color of an object changes depending on where the object is in the captured image due to an influence of peripheral darkening caused by a lens and an image sensor, it is necessary to repeat user operations many times while changing the position of the object in the captured image if a model including this phenomenon is to be created.

SUMMARY OF THE INVENTION

The present disclosure is directed to a technique capable of easily generating a skin color model while considering possible peripheral darkening of an imaging apparatus. According to an aspect of at least one embodiment of the present disclosure, an information processing apparatus configured to generate a color table used when a composite image is generated by combining a virtual object and a captured image in which a physical space is captured by an image capturing unit, includes an acquisition unit configured to acquire a first image in which a predetermined object is captured with a predetermined exposure condition, and at least one second image in which the predetermined object is captured with an exposure condition or a plurality of exposure conditions different from the predetermined exposure condition; an extraction unit configured to extract color information relating to the predetermined object based on the first image and the at least one second image; and a generation unit configured to generate a color table based on the extracted color information.

According to other aspects of the present disclosure, one or more additional information processing apparatuses, one or more information processing systems, one or more information processing methods, and one or more storage mediums for use with same are discussed herein. Further features of the present disclosure will become apparent from the following description of exemplary embodiments with reference to the attached drawings.

DESCRIPTION OF THE EMBODIMENTS

A first exemplary embodiment of the present disclosure will be described in detail below with reference to the drawings.

<Configuration of Apparatus>

Figure 1A:
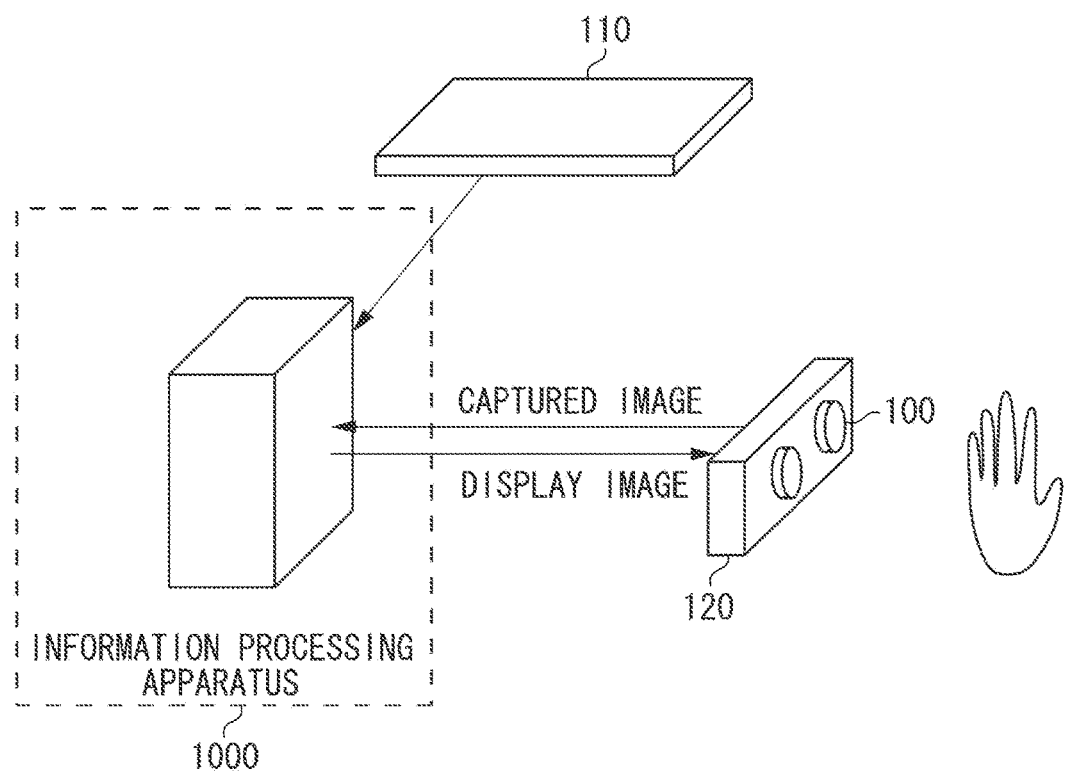
FIGS. 1A, 1B, and 1C are diagrams illustrating a configuration of an information processing system according to an exemplary embodiment of the present disclosure.
Figure 1B:
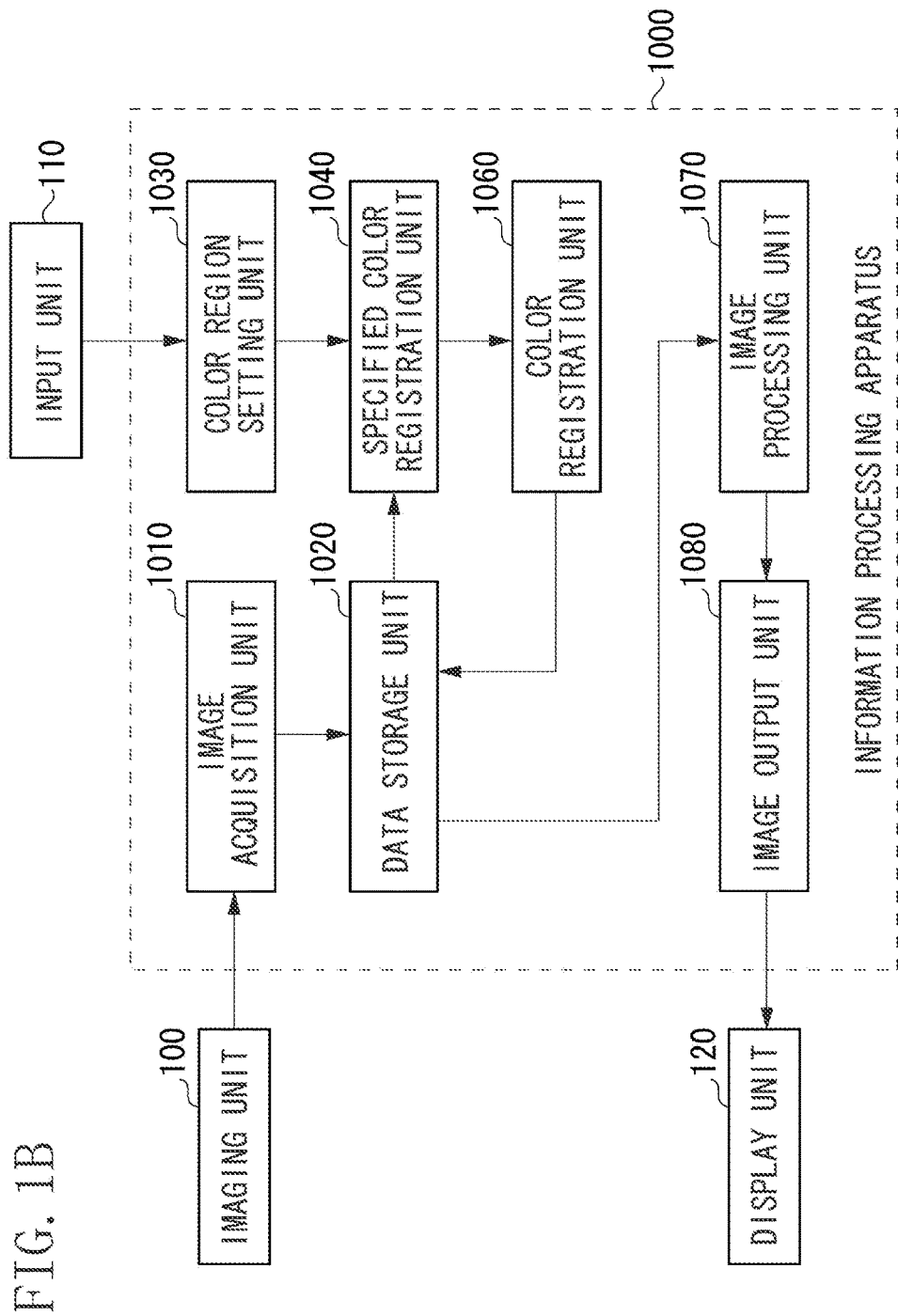
Figure 1C:
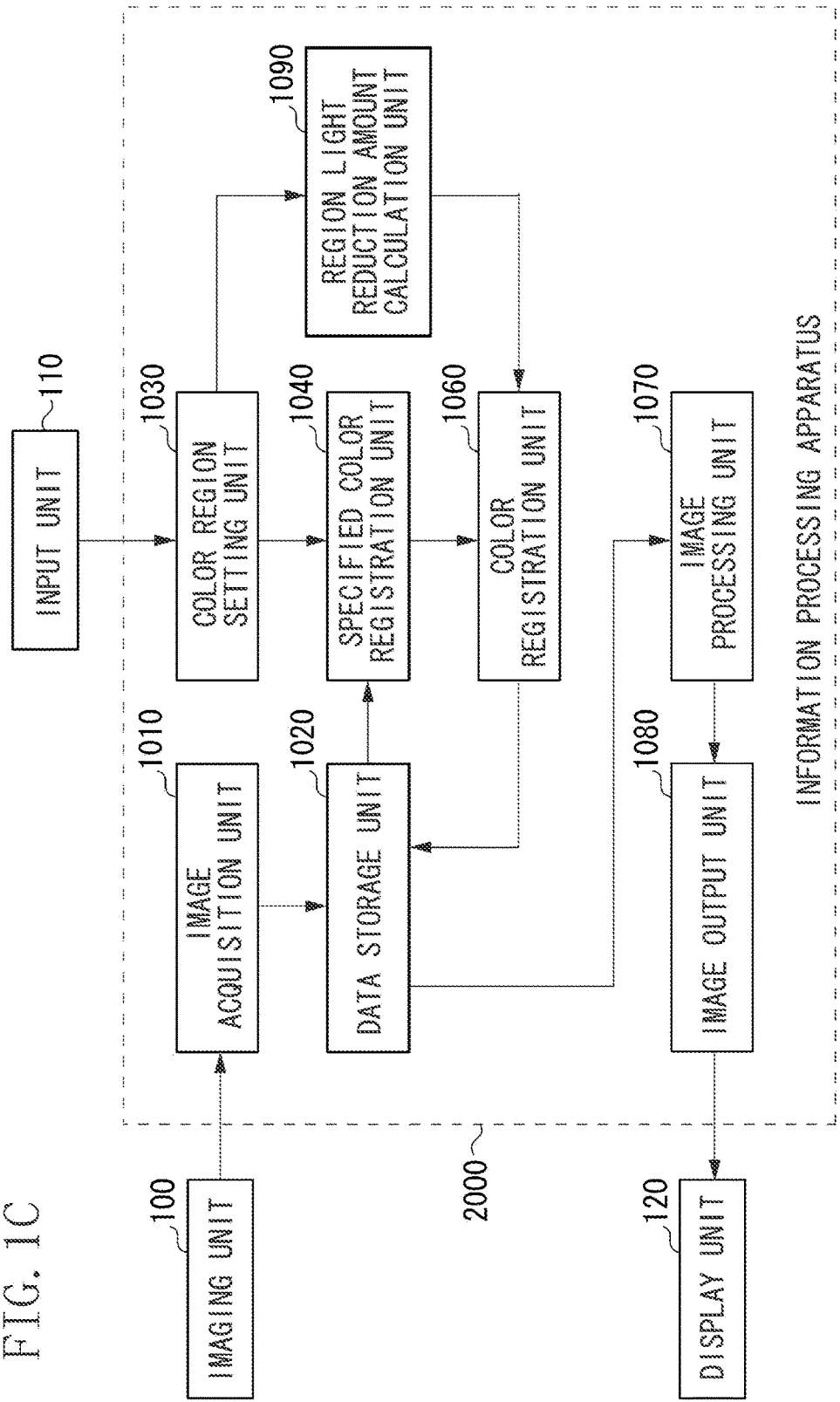

FIGS. 1A, 1B, and 1C are schematic diagrams illustrating a configuration of an information processing system according to the present exemplary embodiment. FIG. 1A is a schematic diagram of the information processing system. The information processing system according to the present exemplary embodiment provides mixed reality (MR) to users by displaying a composite image in which computer graphics (CG) have been superimposed according to the position-and-orientation of the imaging apparatus. The information processing system of the present exemplary embodiment has a configuration in which an imaging unit 100, an input unit 110, and a display unit 120 are connected to an information processing apparatus 1000. The imaging unit 100 is configured of, for example, a camera mounted on a video see-through type head-mounted display (HMD) or a network camera, the input unit 110 is configured of a mouse and a keyboard, and the display unit 120 is configured of a display such as an HMD and a personal computer (PC) monitor. Further, the information processing apparatus 1000 includes a central processing unit (CPU) and a storage unit such as a read only memory (ROM), a random access memory (RAM), and a hard disk drive (HDD), and a video capture card for capturing images obtained by the imaging unit 100. Each function described below is implemented by the CPU executing a control program stored in the storage unit such as the ROM, RAM, and/or HDD.

FIG. 1B is a schematic block diagram illustrating a software configuration of the information processing apparatus 1000 according to the present exemplary embodiment. As illustrated in FIG. 1B, the information processing apparatus 1000 includes an image acquisition unit 1010, a data storage unit 1020, a color region setting unit 1030, a specified color extraction unit 1040, a color registration unit 1060, an image processing unit 1070, and an image output unit 1080. The image acquisition unit 1010 sets camera control values relating to an exposure amount such as an a shutter speed, a gain value, and an aperture value, to the imaging unit 100. Further, the image acquisition unit 1010 acquires a captured image, from the imaging unit 100, captured with the set camera control values and stores it in the data storage unit 1020.

The data storage unit 1020 stores virtual object data, captured images input from the image acquisition unit 1010, and a color table (i.e., skin color model) input from the color registration unit 1060. The color region setting unit 1030 sets a region input from the input unit 110 as a color region in which the skin color exists. The specified color extraction unit 1040 acquires color information of pixels. In the present exemplary embodiment, the color information is information such as CbCr or a*b* which does not include luminance and brightness. However, it is not limited thereto, and any color space independent of brightness components can be the color information.

The color registration unit 1060 functions as a generation unit for generating data of color table (color information), based on the color region including the skin color set by the color region setting unit 1030 and the color information of the pixels acquired by the specified color extraction unit 1040. Further, the generated color table is stored in the data storage unit 1020.

Then, when a user actually performs an MR experience using the information processing system, the physical space image is captured by a camera (i.e., the imaging unit 100) mounted on the HMD. Then, the image processing unit 1070 performs skin color extraction from the result registered by the color registration unit 1060 with respect to the captured image, and generates a composite image based on which extraction result can be recognized. More specifically, for example, the image processing unit 1070 estimates a user's hand region from the captured image and generates a composite image by composing the captured image in the physical space and the CG as the virtual object in such a manner that the CG is not drawn in the user's hand region. The image output unit 1080 outputs the composite image combined by the image processing unit 1070. The actual MR experience may be performed by another information processing system. In this case, the information processing system of the present exemplary embodiment outputs the generated color table information.

<Details of Color Registration Processing>

Figure 2:
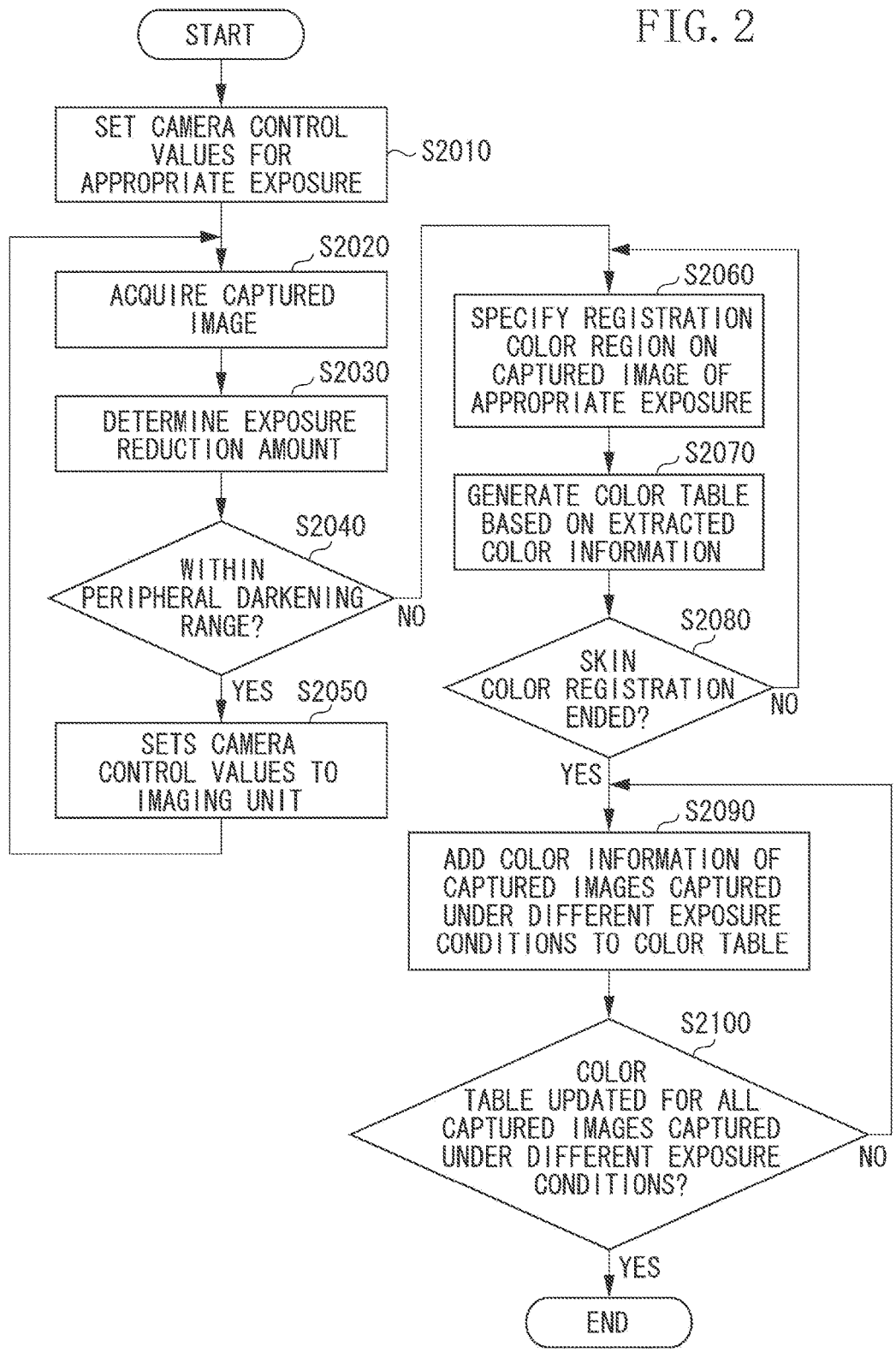
FIG. 2 is a flowchart illustrating color registration processing according to a first exemplary embodiment.

FIG. 2 is a flowchart illustrating color registration processing in the information processing apparatus 1000 according to the present exemplary embodiment. First, in step S2010, the image acquisition unit 1010 sets a camera control values for an appropriate exposure (predetermined exposure condition) to the imaging unit 100. The appropriate exposure is an exposure with witch an object can be reproduced with a natural brightness and color. In the information processing apparatus 1000 according to the present exemplary embodiment, a shutter speed, a gain value, and an aperture value are automatically controlled to obtain an appropriate exposure. On the other hand, in a case of manual exposure, camera control values such as a shutter speed, a gain value, and an aperture value are set as determined by a user's instruction beforehand. Further, the present exemplary embodiment includes a guide unit for guiding an object of a user's skin color to be captured near a center of the captured image. More specifically, for example, a guide is displayed near the center of the captured image on the display unit 120. The guide may be a contour edge line or a shape of the object (e.g., hand) in a schematic form.

In step S2020, the image acquisition unit 1010 acquires the image captured by the imaging unit 100 using the camera control values set in step S2010 (described above) or in step S2050 (described below), and stores it in the data storage unit 1020.

In step S2030, a control unit (CPU) determines a reduction amount of exposure to reduce an exposure amount with respect to the appropriate exposure. In the present exemplary embodiment, a change amount of the reduction amount is assumed to be constant and, for example, the exposure amount is controlled to reduce 10% with respect to the appropriate exposure each time the processing in step S2030 is performed, i.e., the reduction amount is determined so as to reduce by −10%, −20%, and −30% each time thereof. Further, the reduction amount of exposure may be controlled to reduce nonlinearly.

Figure 3A:
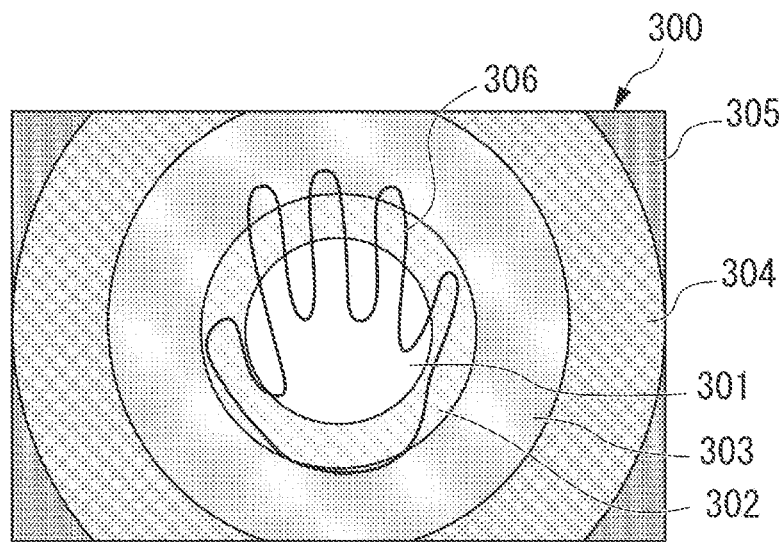
FIGS. 3A and 3B are diagrams schematically illustrating peripheral darkening of an imaging unit according to an exemplary embodiment.

In step S2040, the control unit (CPU) determines whether the reduction amount of the exposure is within the range of the peripheral darkening of the imaging unit 100. The peripheral darkening is generally lowest at the center of the captured image and is darkening almost concentrically from the center to the periphery of the captured image. FIG. 3A is a diagram schematically illustrating a captured image 300 captured by the imaging unit 100 according to the present exemplary embodiment, and an amount of peripheral darkening. Assuming that an area 301 has a 100% exposure value, the imaging unit 100 has a characteristic that an area 302 is −10% darker, an area 303 is −20% darker, an area 304 is −30% darker, an area 305 is −40% darker than the area 301. In other words, in the case of the present exemplary embodiment, the imaging unit 100 has a peripheral darkening characteristic having the distribution as illustrated in FIGS. 3 and −40% exposure value down at maximum compared to the center of the captured image 300.

Such a characteristic of the peripheral darkening is stored in the data storage unit 1020 of the information processing apparatus 1000 as a profile. For example, in step S2030, if the reduction amount of exposure is determined as −10%, the reduction amount at that time is smaller than the maximum darkening (i.e., −40%) that the imaging unit 100 has. Therefore, in step S2040, the control unit (CPU) determines that the reduction amount of exposure is within the range of peripheral darkening that the imaging unit 100 has (YES in step S2040). In this case, the processing proceeds to step S2050. On the other hand, in step S2030, if the reduction amount is larger than −40%, then, in step S2040, the control unit (CPU) determines that the reduction amount of exposure is not within the range of peripheral darkening that the imaging unit 100 has (NO in step S2040). In this case, the processing proceeds to step S2060. In the present exemplary embodiment, in order to facilitate the description, the characteristic of peripheral darkening that imaging unit 100 has is described at 10% intervals. However, it is needless to say that actually the peripheral darkening amount continuously changes between areas. In addition, if the imaging unit 100 performs any correction processing such as a shading correction for correcting the peripheral darkening, it is needless to say that the above-described characteristic of peripheral darkening is that of the captured image having subjected to the correction processing.

In step S2050, the image acquisition unit 1010 sets camera control values to the imaging unit 100 so as to reduce the exposure amount according to the reduction amount of exposure determined in step S2030. Then, the processing returns to step S2020. In step S2020, the image acquisition unit 1010 acquires a captured image of under exposure. In a case where the imaging unit 100 automatically controls the exposure, the exposure can be controlled by shifting the automatic exposure level corresponding to the reduction amount. At that time, since the processing from steps S2020 to S2050 have to be performed quickly, it is desirable that the convergence time of the automatic exposure is set to be shorter than that of the normal case. On the other hand, in a case of the manual exposure, for example, the shutter speed is set faster corresponding to the light reduction amount to control the exposure. Further, even in a case where the exposure is controlled using the automatic exposure, the exposure is controlled using only a specific control value by locking the automatic exposure in step S2010, and setting, for example, the shutter speed faster using the camera control values at that time as a reference.

In step S2060, the color region setting unit 1030 specifies a color region on the captured image of the appropriate exposure acquired by the image acquisition unit 1010. The color region setting unit 1030 specifies the skin color region specified by the user's GUI operation performed using the input unit 110 as the color region. For example, a color region 306 is specified with respect to the captured image 300 as illustrated in FIG. 3A. Further, the skin color region may be specified automatically based on the color information of the captured image.

In step S2070, the color registration unit 1060 generates a color table based on the color information extracted by the specified color extraction unit 1040 with respect to the pixels within the region specified by the color region setting unit 1030. Then, data of the generated color table is registered to the data storage unit 1020.

In step S2080, the extraction result of the color table registered to the data storage unit 1020 is present to the user to check whether to end the skin color registration. Then, if it is determined to end the skin color registration (YES in step S2080), the processing proceeds to step S2090. Otherwise (NO in step S2080), the processing returns to step S2060. The extraction result of the skin color is presented by emphasizing the extracted region in the captured image of appropriate exposure. For example, red color may be overlapped on the pixels to be emphasized using alpha blending, or black color may be overlapped thereon. Other methods can be used as long as the extraction result display is possible. Therefore, in step S2080, the image output unit 1080 outputs the composite image generated by the image processing unit 1070 to the display unit 120.

In step S2090, the color registration unit 1060 updates the color table registered to the data storage unit 1020 by using the color region in the captured image of the appropriate exposure set in step S2060, and the captured image of the under exposure acquired by the image acquisition unit 1010. The update of the color table is performed by adding, to the color table registered in the data storage unit 1020, the color information extracted by the specified color extraction unit 1040 from the pixels within the color region in the captured image of under exposure.

In step S2100, the control unit (CPU) determines whether, on all the captured images captured under a plurality of different exposure conditions excluding the appropriate exposure condition, the color table has been updated in step S2090, using the captured images. Then, if the color table has been updated for all the captured images (YES in step S2100), the control unit (CPU) ends the processing.

In the present exemplary embodiment, in generating and updating the color table, the color region is specified by the user to generate the color table from the color information of pixels within the color region. However, the configuration of the present exemplary embodiment is not limited thereto. For example, it is useful to obtain an effective color region with few false detections and few excessive detections based on the distribution of color information within and outside the color region.

As described above, according to the present exemplary embodiment, using a captured image captured under an appropriate exposure condition and images captured under exposure conditions considering the peripheral darkening, one specification of a color region allows a color table to be generated. Accordingly, a user can generate, with a simple operation, a skin color model in which peripheral darkening that an imaging apparatus has is taken into consideration.

In the first exemplary embodiment, in acquiring a captured image including a skin color object of a user, the user is guided to place the user's skin color object at near the center of the screen where the peripheral darkening is smallest so as to set the color region at near the center of the screen. On the other hand, in acquiring a captured image, when the position of the user's skin color object is not guided, the object may be placed apart from near the center. In that case, the bright skin color information, which is supposed to be obtained at near the center of the captured image, may not be obtained. Then, in a second exemplary embodiment, over exposure captured images are also obtained in advance, and the captured image to be used to update the color table is changed according to the light reduction amount of the set color region. With this processing, even if the position of the user's skin color object is not particularly guided, the color table can be appropriately generated. The second exemplary embodiment according to the present disclosure will be described in detail below with reference to the drawings. The configurations described in the first exemplary embodiment are denoted the same symbols and the descriptions thereof are not repeated.

<Apparatus Configuration>

FIG. 1C is a schematic block diagram illustrating a software configuration of the information processing apparatus 1000 according to the present exemplary embodiment. As illustrated in FIG. 1C, the information processing apparatus 2000 according to the present exemplary embodiment includes a region light reduction amount calculation unit 1090, in addition to the configuration described in the first exemplary embodiment. The region light reduction calculation unit 1090 acquires a color region from the color region setting unit 1030 and calculates the light reduction amount in the captured image based on a position of the color region with respect to the captured image.

<Details of Color Registration Processing>

Figure 4:
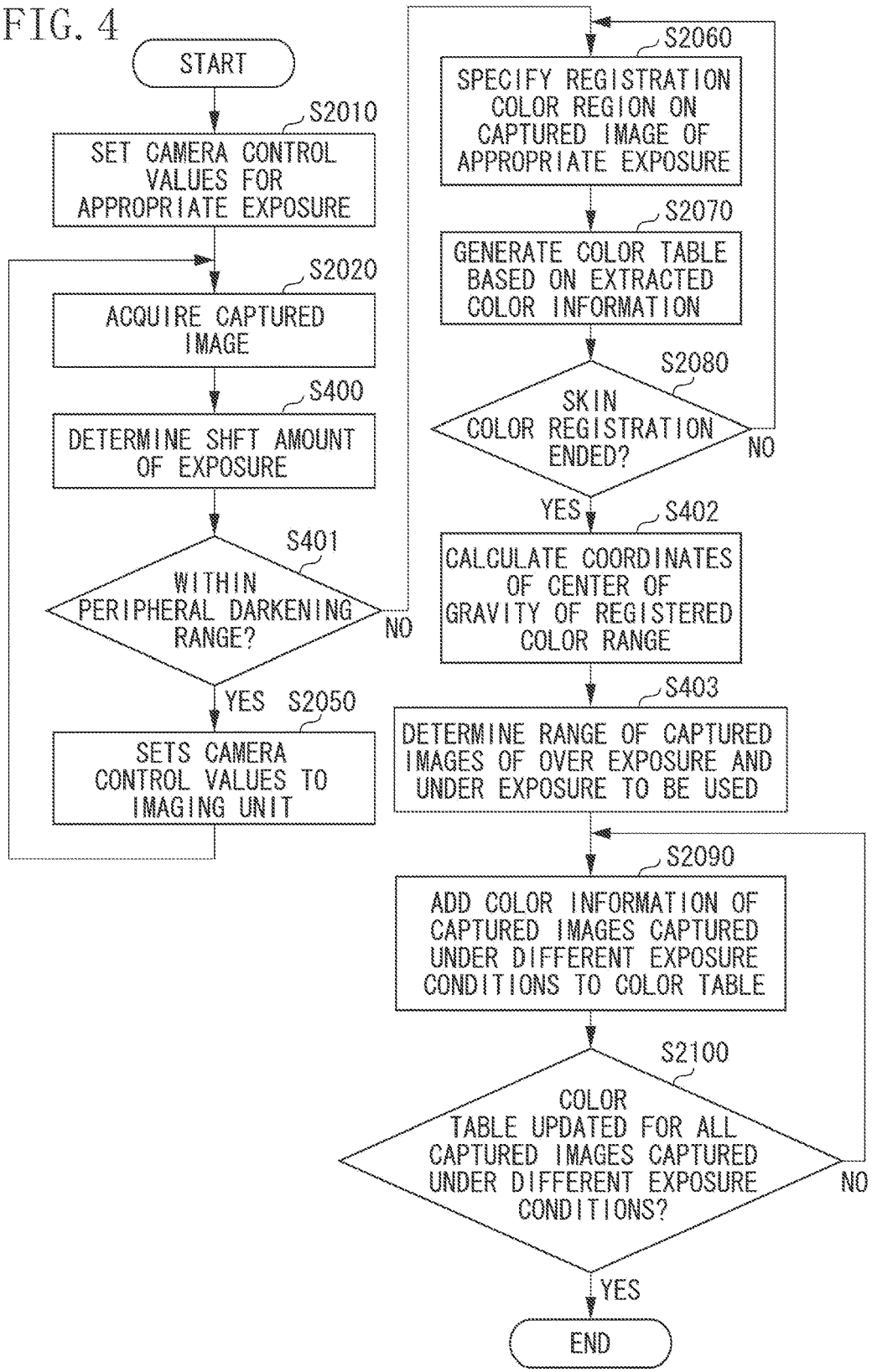
FIG. 4 is a flowchart illustrating color registration processing according to a second exemplary embodiment.

FIG. 4 is a flowchart illustrating color registration processing performed in the information processing apparatus 2000 according to the present exemplary embodiment. In the color registration processing according to the present exemplary embodiment, in place of the color registration processing performed in steps S2030 and 2040 in the first exemplary embodiment, the processing in steps S400 and S401 is executed. In addition, between steps S2080 and S2090, the processing in steps S402 and S403 is executed.

First, in step S400, the control unit (CPU) determines a shift amount of the exposure to make the exposure to be over exposure and under exposure with respect to the appropriate exposure. In the present exemplary embodiment, a change amount of the shift amount is constant, and for example, the exposure amount is controlled to reduce or increase 10% with respect to the appropriate exposure each time the processing in step S400 is performed. More specifically, the change amount is determined so as to reduce or increase by −10%, +10%, −20%, and +20% step by step with respect to the appropriate exposure. Further, in the present exemplary embodiment, the shift amount of the exposure may be controlled nonlinearly.

Figure 3B:
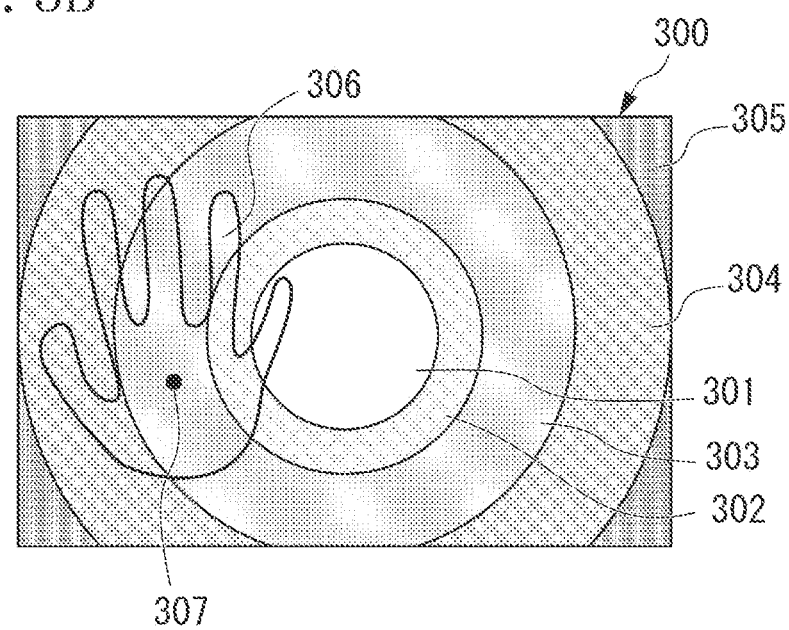

In step S401, the control unit (CPU) determines whether the shift amount of the exposure is within the range of peripheral darkening that the imaging unit 100 has determined in step S400. In the present exemplary embodiment, the determination of the shift amount is performed by comparing the shift amount and the absolute value of the maximum peripheral darkening of the imaging unit 100. FIG. 3B is a schematic diagram illustrating the captured image 300 captured by the imaging unit 100 according to the present exemplary embodiment and the amount of the peripheral darkening. As illustrated in FIG. 3B, the characteristic of peripheral darkening that the imaging unit 100 has in the present exemplary embodiment is similar to that in the first exemplary embodiment described above, and the imaging unit 100 has a characteristic in which the exposure amount becomes −40% at maximum compared with the center. Then, for example, in step S400, when the shift amount of the exposure is −10% and +10%, the absolute value of the shift amount is smaller than the absolute value 40% of the maximum peripheral darkening of the imaging unit 100 (YES in step S401), the processing proceeds to step S2050. In addition, in step S401, if the absolute value of the shift amount is larger than 40% (NO in step S401), the processing proceeds to step S2060.

Next, the processing performed in step S402 and S403 is described. In step S402, the region light reduction amount calculation unit 1090 calculates the position of the color region in the captured image set by the color region setting unit 1030 to obtain the light reduction amount in the color region. In the present exemplary embodiment, the region light reduction amount calculation unit 1090 calculates the center of gravity coordinates of the set color region, and refers to the characteristic of the peripheral darkening that the imaging unit 100 has to obtain the light reduction amount of the color region from the center of gravity coordinates. For example, FIG. 3B includes the specified color region 306 and the center of gravity coordinates 307 of the color region 306. Since the center of gravity coordinates 307 is positioned in the area 303, the light reduction amount at the center of gravity coordinate 307 is −20%.

In step S403, the color registration unit 1060 determines the range of the captured images of over exposure and under exposure, to be used in the update processing of the color table obtained in step S2090 based on the light reduction amount in the color region obtained in step S402. For example, in a case where the center of gravity coordinate 307 of the color region 306 is located at a position illustrated in FIG. 3B, the light reduction amount of the color region is −20%. In the captured image of the appropriate exposure, most pixels in the color region have a skin color of −20% exposure amount. Therefore, it is determined that the captured images captured with up to +20% shift amount are used as captured images of overexposure so that the skin color is captured with an exposure amount similar to that captured in the area 301, i.e., in the region with no peripheral darkening. In addition, as for the captured images of under exposure, even in the captured image of appropriate exposure, the exposure amount of the pixels in the color region are −20% and the peripheral darkening that the imaging unit 100 has is −40% at maximum compared to the center portion. Therefore, it is determined that the captured images captured with up to −20% shift amount are used. Using the captured images captured under the exposure condition determined as described above, in steps S2090 and S2100, the color table is updated similar to the first exemplary embodiment.

As described above, according to the present exemplary embodiment, the captured images of over exposure and under exposure used to generate the color table are adaptively changed according to the light reduction amount influenced by the position of the color region in the captured image, i.e., influenced by the peripheral darkening. With this operation, in a case where a color region is specified at any position within a captured image, a user can generate, with an easy operation, a skin color model in which peripheral darkening of the imaging apparatus is considered.

With the configuration described above, according to the present exemplary embodiment, it is possible to easily generate a skin color model in which peripheral darkening is considered.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232513, filed Nov. 28, 2015, which is hereby incorporated by reference herein in its entirety.

What is claimed is:

1. An information processing apparatus configured to generate a color table used when a composite image is generated by combining a virtual object and a captured image in which a physical space is captured by a camera or a sensor, the information processing apparatus comprising:
   one or more memories; and
   one or more processors in communication with the one or more memories, the one or more processors operating to:
   acquire a first image in which a predetermined object is captured with a predetermined exposure condition, and at least one second image in which the predetermined object is captured with an exposure condition or a plurality of exposure conditions different from the predetermined exposure condition;
   extract color information relating to the predetermined object based on the first image and the at least one second image; and
   generate a color table based on the extracted color information,
   wherein the one or more memories operate to store information about peripheral darkening of the camera or the sensor used to capture the first image and the at least one second image, and the one or more processors acquire the at least one second image based on the information about the peripheral darkening stored in the one or more memories.

2. The information processing apparatus according to claim 1, wherein the one or more processors generate the color table based on the color information extracted from the first image, and update the generated color table based on the color information extracted from the at least one second image.

3. The information processing apparatus according to claim 1, further comprising a guide that operates to guide the predetermined object to a position at a center with respect to the first image and the at least one second image.

4. The information processing apparatus according to claim 3,
   wherein a display that operates to display the first image and the at least one second image, which are to be captured, is connected to the information processing apparatus, and
   wherein the guide is displayed on the display to guide the predetermined object to the position at the center with respect to the first image and the at least one second image.

5. The information processing apparatus according to claim 3, wherein the one or more processors further operate to determine a range of the plurality of exposure conditions of the at least one second image used by the one or more processors, based on the information about the peripheral darkening stored in the one or more memories and the position of the predetermined object with respect to the first image and the at least one second image.

6. The information processing apparatus according to claim 1, wherein the one or more processors extract the color information in a region specified by a user with respect to the first image and the at least one second image.

7. The information processing apparatus according to claim 1, wherein the predetermined object is a user's hand.

8. The information processing apparatus according to claim 1, wherein the plurality of exposure conditions is obtained by linearly changing an exposure amount.

9. The information processing apparatus according to claim 1, wherein the one or more processors further operate to generate the composite image by combining the virtual object and the captured image in which the physical space is captured by the camera or the sensor based on the generated color table.

10. An information processing system configured to generate a color table used when a composite image is generated by combining a virtual object and a captured image in which a physical space is captured by a camera or a sensor, the information processing system comprising:
    the camera or the sensor configured to capture at least one image;
    one or more memories; and
    one or more processors in communication with the one or more memories, the one or more processors operating to:
    acquire a first image in which a predetermined object is captured with a predetermined exposure condition using the camera or the sensor, and at least one second image in which the predetermined object is captured with an exposure condition or a plurality of exposure conditions different from the predetermined exposure condition;
    extract color information relating to the predetermined object based on the first image and the at least one second image; and
    generate the color table based on the extracted color information,
    wherein the one or more memories operate to store information about peripheral darkening of the camera or the sensor used to capture the first image and the at least one second image, and the one or more processors acquire the at least one second image based on the information about the peripheral darkening stored in the one or more memories.

11. An information processing method for generating a color table used when a composite image is generated by combining a virtual object and a captured image in which a physical space is captured by a camera or a sensor, the information processing method comprising:
    acquiring, via one or more processors, a first image in which a predetermined object is captured with a predetermined exposure condition, and at least one second image in which the predetermined object is captured with an exposure condition or a plurality of exposure conditions different from the predetermined exposure condition, the first image and the at least one second image being acquired based on information about peripheral darkening of the camera or the sensor where the information is stored in one or more memories in communication with the one or more processors;
    extracting, via the one or more processors, color information relating to the predetermined object based on the first image and the at least one second image; and
    generating, via the one or more processors, a color table based on the extracted color information.

12. A non-transitory computer-readable recording medium recording a program to cause a computer to perform an information processing method for an information processing apparatus configured to generate a color table used when a composite image is generated by combining a virtual object and a captured image in which a physical space is captured by a camera or a sensor, the information processing method comprising:
    acquiring, via one or more processors, a first image in which a predetermined object is captured with a predetermined exposure condition, and at least one second image in which the predetermined object is captured with an exposure condition or a plurality of exposure conditions different from the predetermined exposure condition, the first image and the at least one second image being acquired based on information about peripheral darkening of the camera or the sensor where the information is stored in one or more memories in communication with the one or more processors;

extracting, via the one or more processors, color information relating to the predetermined object based on the first image and the at least one second image; and generating, via the one or more processors, a color table based on the extracted color information.

13. An information processing apparatus configured to generate a color table used when a composite image is generated by combining a virtual object and a captured image in which a physical space is captured by a camera or a sensor, the information processing apparatus comprising:

one or more processors that operate to:

acquire a first image in which a predetermined object is captured with a predetermined exposure condition, and at least one second image in which the predetermined object is captured with an exposure condition or a plurality of exposure conditions different from the predetermined exposure condition;

extract color information relating to the predetermined object based on the first image and the at least one second image;

generate a color table based on the extracted color information and based on the color information extracted from the first image; and change the generated color table based on the color information extracted from the at least one second image.

* * * * *